United States Patent
Panchaksharaiah et al.

(10) Patent No.: US 11,943,507 B2
(45) Date of Patent: Mar. 26, 2024

(54) MASKING BRANDS AND BUSINESSES IN CONTENT

(71) Applicant: Rovi Guides, Inc., San Jose, CA (US)

(72) Inventors: Vishwas Sharadanagar Panchaksharaiah, Karnataka (IN); Vikram Makam Gupta, Karnataka (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/574,110

(22) Filed: Jan. 12, 2022

(65) Prior Publication Data

US 2023/0224542 A1 Jul. 13, 2023

(51) Int. Cl.
*H04N 21/454* (2011.01)
*H04N 21/44* (2011.01)
*H04N 21/4402* (2011.01)

(52) U.S. Cl.
CPC ... *H04N 21/4542* (2013.01); *H04N 21/44008* (2013.01); *H04N 21/4402* (2013.01)

(58) Field of Classification Search
None
See application file for complete search history.

(56) References Cited

U.S. PATENT DOCUMENTS

| | | | |
|---|---|---|---|
| 10,169,850 B1 * | 1/2019 | Carey | G06F 3/0304 |
| 2008/0138030 A1 * | 6/2008 | Bryan | H04N 5/445 |
| | | | 348/E5.103 |
| 2010/0325653 A1 * | 12/2010 | Matz | H04N 21/4542 |
| | | | 725/28 |
| 2011/0321082 A1 * | 12/2011 | Weerasinghe | H04N 5/445 |
| | | | 725/139 |
| 2014/0245335 A1 * | 8/2014 | Holden | H04N 21/44218 |
| | | | 725/12 |
| 2014/0278998 A1 * | 9/2014 | Systrom | G06Q 30/0277 |
| | | | 705/14.57 |
| 2014/0279039 A1 * | 9/2014 | Systrom | G06Q 30/0224 |
| | | | 705/14.66 |

(Continued)

OTHER PUBLICATIONS

"How to Blur Anything You Need to in Your YouTube Video", https://vidiq.com/blog/post/youtube-blur-tool/ (2020).

(Continued)

*Primary Examiner* — William J Kim
(74) *Attorney, Agent, or Firm* — Haley Guiliano LLP

(57) ABSTRACT

Systems and methods are presented herein for selectively preventing display of brand and business identifiers in content that is considered offensive, objectionable, disturbing, and/or unsettling, to prevent an unintended association by viewers of the content between the content and the brand or business. A request to display media content, comprising at least one frame with objectionable subject matter, is received. In response to determining the at least one frame comprises objectionable subject matter, a determination is made as to whether an entity identifier is visible in the at least one frame. In response to determining at least one entity identifier is visible in the at least one frame, a first context of the objectionable subject matter and a second context of the entity identifier are determined. The first context is compared to the second context and, based on the comparing, a masking action is determined to be required for the entity identifier.

20 Claims, 11 Drawing Sheets

(56) References Cited

U.S. PATENT DOCUMENTS

| | | | | |
|---|---|---|---|---|
| 2014/0279068 | A1* | 9/2014 | Systrom | G06Q 30/0269 |
| | | | | 705/14.73 |
| 2015/0062287 | A1* | 3/2015 | Reinhardt | H04N 21/25841 |
| | | | | 348/36 |
| 2017/0329983 | A1* | 11/2017 | Grant | G06F 16/9535 |
| 2018/0246983 | A1* | 8/2018 | Rathod | G06F 16/9566 |
| 2018/0278582 | A1* | 9/2018 | Cleaver | H04L 63/0245 |
| 2018/0302693 | A1* | 10/2018 | Krestiannykov | G06F 3/048 |
| 2019/0028533 | A1* | 1/2019 | Rohatgi | H04L 67/06 |
| 2019/0082239 | A1* | 3/2019 | Webster | H04H 20/38 |
| 2020/0029128 | A1* | 1/2020 | Erskine | H04N 21/4784 |
| 2021/0084194 | A1* | 3/2021 | Rakshit | H04N 1/4493 |
| 2021/0097118 | A1* | 4/2021 | Cudak | H04L 63/102 |
| 2021/0357447 | A1* | 11/2021 | Mckenzie | G06F 16/638 |
| 2021/0400345 | A1* | 12/2021 | Turunen | G06T 5/002 |

OTHER PUBLICATIONS

"How to Blur Faces in Video", https://www.criticalmention.com/media-monitoring/.
https://www.videostudiopro.com/en/tips/basics/blur-video/.

* cited by examiner

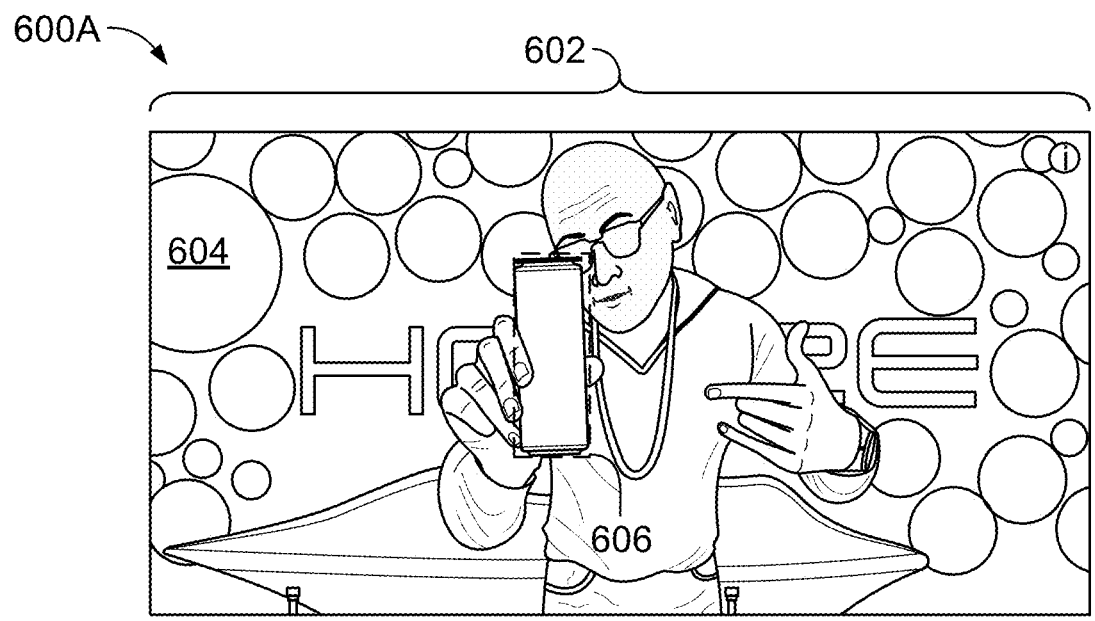
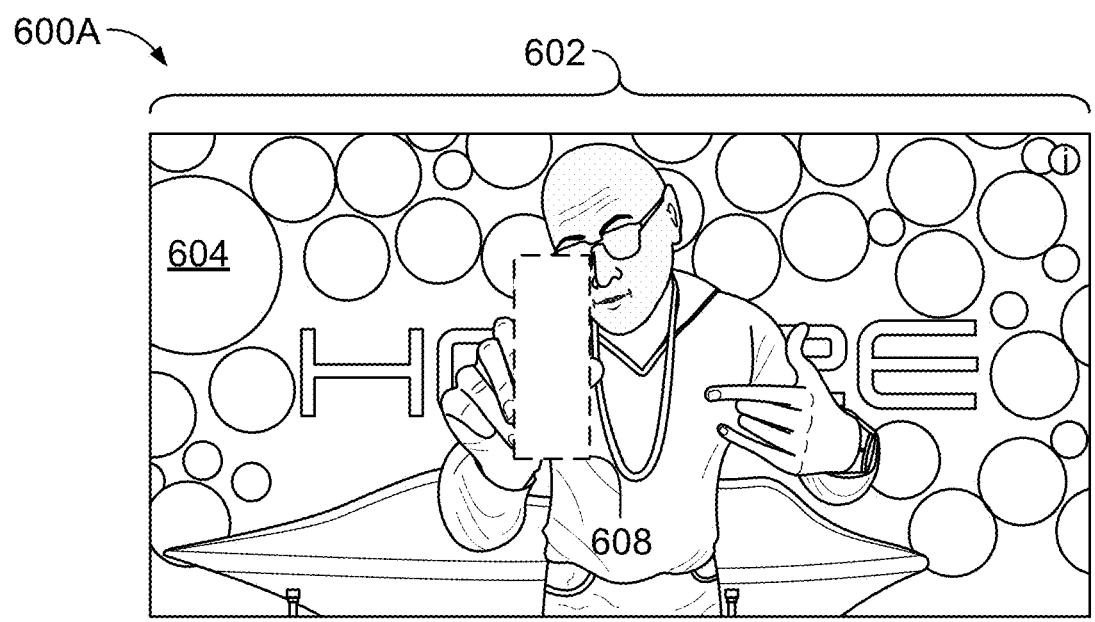
FIG. 6

800A

| Business Entity Name (802A) | Entity Identifiers (804A) | Objectionable Content to Mask Identifiers (806A) |
|---|---|---|
| Apple | Logo<br>Company Name<br>Device | 1) car accidents where products and/or logos are present<br>2) protests/riots aysnchronous with company agenda where products and/or logos are present<br>3) media content characters associated with content unsuitable for children of a certain age where products and/or logos are present |
| Samsung | Logo<br>Company Name<br>Device | 1) car accidents where products and/or logos are present<br>2) protests/riots aysnchronous with company agenda where products and/or logos are present<br>3) media content characters associated with content unsuitable for children of a certain age where products and/or logos are present |
| Google | Logo<br>Company Name<br>Device | 1) car accidents where products and/or logos are present<br>2) protests/riots aysnchronous with company agenda where products and/or logos are present<br>3) media content characters associated with content unsuitable for children of a certain age where products and/or logos are present |

800B

| Business Entity Name (802B) | Entity Identifiers (804B) | Objectionable Content to Mask Identifiers (806B) |
|---|---|---|
| Tesla | Logo<br>Company Name<br>Vehicles<br>Dealership | 1) car accidents where products and/or logos are present<br>2) protests/riots aysnchronous with company agenda where products and/or logos are present |
| BMW | Logo<br>Company Name<br>Vehicles<br>Dealership | 1) car accidents where products and/or logos are present<br>2) protests/riots aysnchronous with company agenda where products and/or logos are present |
| HONDA | Logo<br>Company Name<br>Vehicles<br>Dealership | 1) car accidents where products and/or logos are present<br>2) protests/riots aysnchronous with company agenda where products and/or logos are present |

| Business Entity Name | Entity Identifiers | Objectionable Content to Mask Identifiers |
|---|---|---|
| Walmart | Logo<br>Company Name<br>Delivery Vehicles<br>Store Locations | 1) car accidents where delivery vehicles, products, and/or logos are present<br>2) protests/riots aysnchronous with company agenda where products and/or logos are present or ocurring within a threshold distance of a store location<br>3) violent crimes having occurred within a threshold distance of a store location<br>4) incidents involving questionable food quality, handling, or sources |
| Burger King | Logo<br>Company Name<br>Restaurant Location | 1) car accidents where products and/or logos are present<br>2) protests/riots aysnchronous with company agenda where products and/or logos are present within a threshold distance of a store location<br>3) violent crimes having occurred within a threshold distance of a store location<br>4) incidents involving questionable food quality, handling, or sources |
| Local Enterprise | Logo<br>Company Name<br>Business Location | 1) car accidents where products and/or logos are present<br>2) protests/riots aysnchronous with company agenda where products and/or logos are present<br>3) violent crimes having occurred within a threshodl distance of a store location<br>4) incidents deterring new customers from checking out local enterprise |

MASKING BRANDS AND BUSINESSES IN CONTENT

BACKGROUND

The present disclosure is directed to systems and methods for masking identifiers of brands and businesses in objectionable content, and more particularly, to systems and methods that prevent display of identifiers of known brands and businesses when the identifiers are visible in content that is considered offensive, objectionable, disturbing, and/or unsettling, in order to prevent a negative connotation from being associated with the visible brands and businesses.

SUMMARY

Portions of media content may be blurred, masked, or censored based on the identification of objectionable content in at least a portion of a frame of the media content generated for display. Objectionable content typically comprises subject matter that might offend viewers or may have an adverse impact on a viewer's mental state. Some examples include explicit or adult content (e.g., in particular explicit or adult content accessible to viewers who are minors), riot scenes, and murder scenes. The blurring, masking, and censoring is typically unintentional and does not consider context of the media content. For example, scenes that may be queued for blurring may have the blurring undone or cancelled based on a content rating and a disclaimer prior to a show. However, some viewers may still prefer the blurring out of aspects. Additionally, commercial implications exist where disturbing scenes or images become associated with products or businesses visible in the scene as the disturbing content is displayed.

Disturbing or unsettling content can impact a viewer's perception of anything associated with the content. For example, brand names displayed as they relate to an accident (e.g., the news reports the brand name of a car that a drunk driver crashed) or as they relate to the scene of a riot (e.g., store names displayed or apparel brands associated with rioters) may be associated with the content, unintentionally yielding a reduction in business for the store or brand-name product. What is needed are systems and methods to prevent the public from unintentionally associating a business or a brand with objectionable, offensive, disturbing, and unsettling events by preventing display of identifiers of the business or brand.

Described herein are systems and methods for preventing display of identifiers of known brands and businesses when the identifiers are visible in content that is considered offensive, objectionable, disturbing, and/or unsettling. For example, an option to selectively mask or obscure entity identifiers visible in content may be provided based on the context of the entity, the entity identifier, and the content displayed. In some embodiments, a request to display media content is received. The media content is determined to comprise at least one frame, wherein the at least one frame comprises objectionable subject matter. In response to determining the at least one frame comprises objectionable subject matter, an entity identifier may be determined to be visible in the at least one frame or an entity identifier may be verbalized and audibly perceptible. In response to determining at least one entity identifier is visible in the at least one frame, a first context of the objectionable subject matter is determined as well as a second context of the entity identifier. The first context is compared to the second context. Based on the comparing, a determination is made whether a masking action is required for the entity identifier. If it is determined based on the first and second contexts that a masking action of the entity identifier is required, the masking action is performed on the at least one frame such that the entity identifier is affected by the masking action while the media content is displayed.

These techniques solve the problems of other approaches described above. In particular, this approach does not rely on ratings of content to decide when to blur aspects of content or remove particular frames of content. Thus, a frame-by-frame analysis of content enables particular aspects of content to be identified for masking actions (e.g., blurring or visibly obscuring) in order to prevent viewing of the particular aspects (e.g., a brand or a business) in unison with the content. Additionally, this approach does not require a central distributor of content to flag portions of content for masking actions. By performing a location-based analysis of the subject matter, as opposed to relying on a larger-scale distribution protocol (e.g., national broadcasting standards), the system can limit the masking to markets pertinent to particular identifiers (e.g., local businesses are targeted for masking in local news stories, while larger-scale businesses are targeted for masking in more nationwide news content).

In some embodiments, the media content comprises at least one of a content item available via a content platform or a media stream. In some embodiments, receiving the request comprises receiving at least one of a character-based input, an audio input, or a selection of an enabling icon. In some embodiments, the objectionable subject matter comprises at least one of violence, a crime, or subject matter that induces adverse commentary. In some embodiments, the entity identifier comprises at least one of a string of characters associated with an entity, a symbol associated with an entity, or a product associated with an entity. In some embodiments, the entity comprises at least one of a business or a brand.

In some embodiments, a location of a device on which the request was received is determined. A database of entities associated with the location is retrieved, wherein the entities in the database require a masking action when detected. The at least one entity identifier is compared to the database of entities. In response to determining the at least one entity identifier corresponds to at least one entity in the database of entities, a selectable option is generated for a masking action for an administrator associated with an entity corresponding to the at least one entity identifier.

In some embodiments, the first context comprises at least one of a location, an event, and an industry adversely affected by the event. In some embodiments, the second context comprises at least one of a location, an industry, and a list of events that adversely impact the industry. In some embodiments, the masking action comprises at least one of removing, visibly obscuring, or audibly obscuring the entity identifier in the at least one frame. In another embodiment, the masking action comprises at least one of audibly obscuring the entity identifier or preventing the entity identifier from being audible in the at least one frame.

BRIEF DESCRIPTIONS OF THE DRAWINGS

The above and other objects and advantages of the disclosure may be apparent upon consideration of the following detailed description, taken in conjunction with the accompanying drawings, in which:

FIG. 6 is an illustrative example of a first version of a content item with unmasked entity identifiers and a second version of the content item with masked entity identifiers, in accordance with some embodiments of the disclosure;

Figure 9:
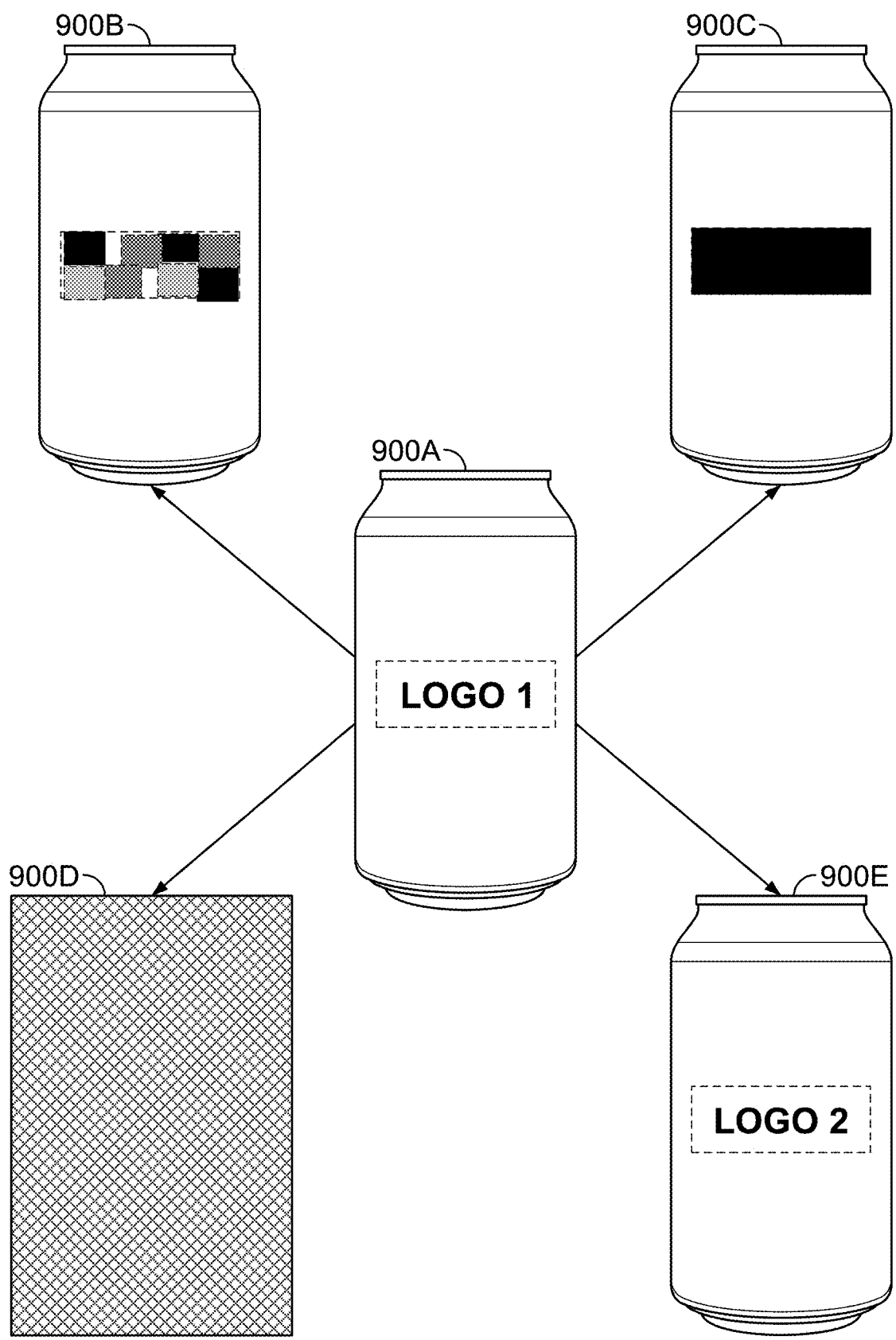
Figure 10:
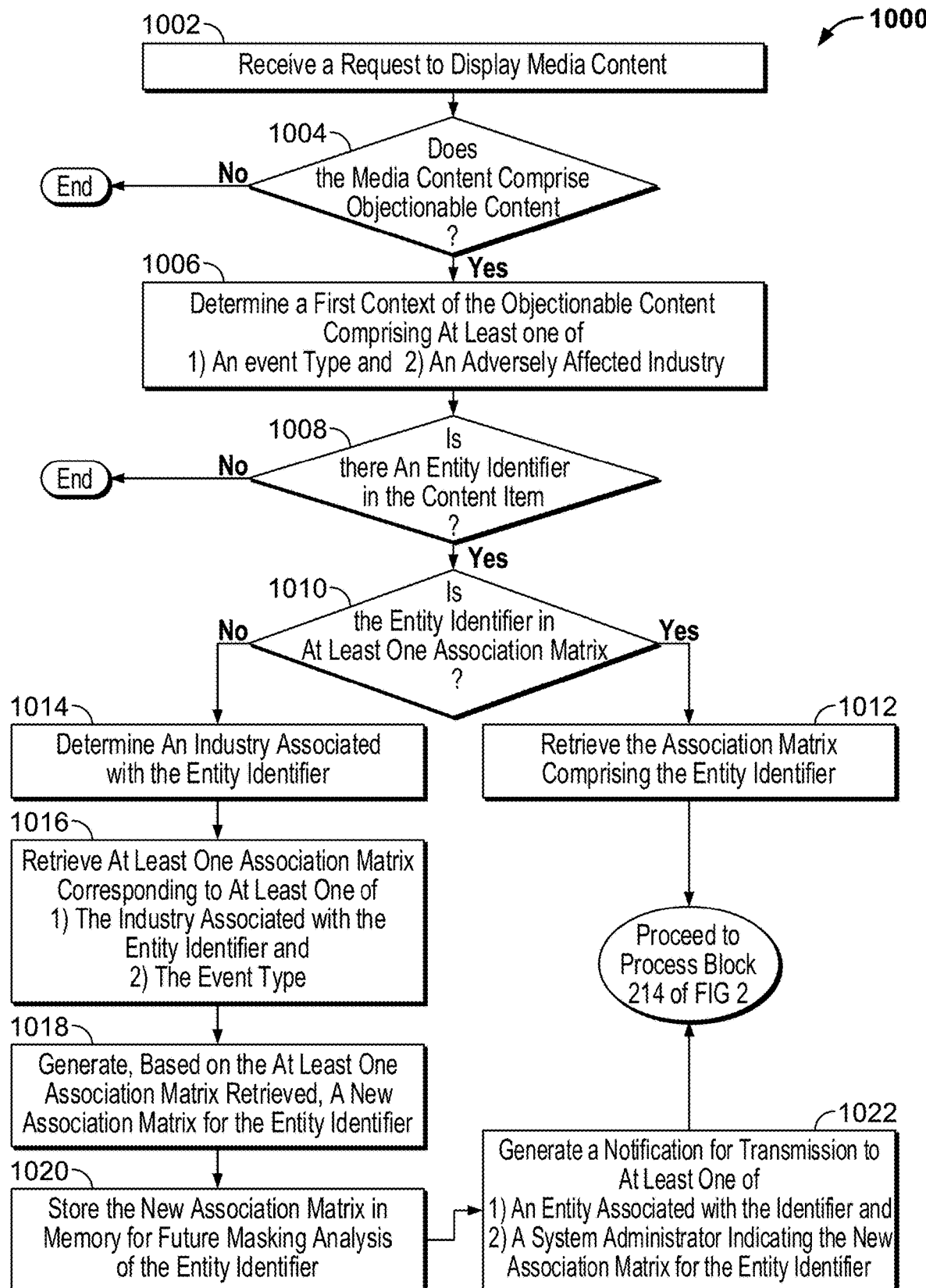

FIG. 8 provides illustrative examples of association matrices used to determine whether entity identifiers should be masked based on the subject matter of a content item in which the entity identifiers are present, in accordance with some embodiments of the disclosure;

FIG. 9 provides illustrative examples of masking actions that are performed for entity identifiers present in a content item comprising objectionable content, in accordance with some embodiments of the disclosure;

FIG. 10 is a flowchart representing an illustrative process for updating a machine learning model configured to provide recommendations to selectively mask new entity identifiers based on information indicative that the subject matter of a content item displaying the new entity identifier may yield a negative association between the entity identifier and the content item displaying the new entity identifier, in accordance with some embodiments of the disclosure.

DETAILED DESCRIPTION

Methods and systems are provided herein for selectively masking business entity identifiers and/or brand identifiers (e.g., logos and other identifying information) visible in objectionable media content.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

Figure 1:
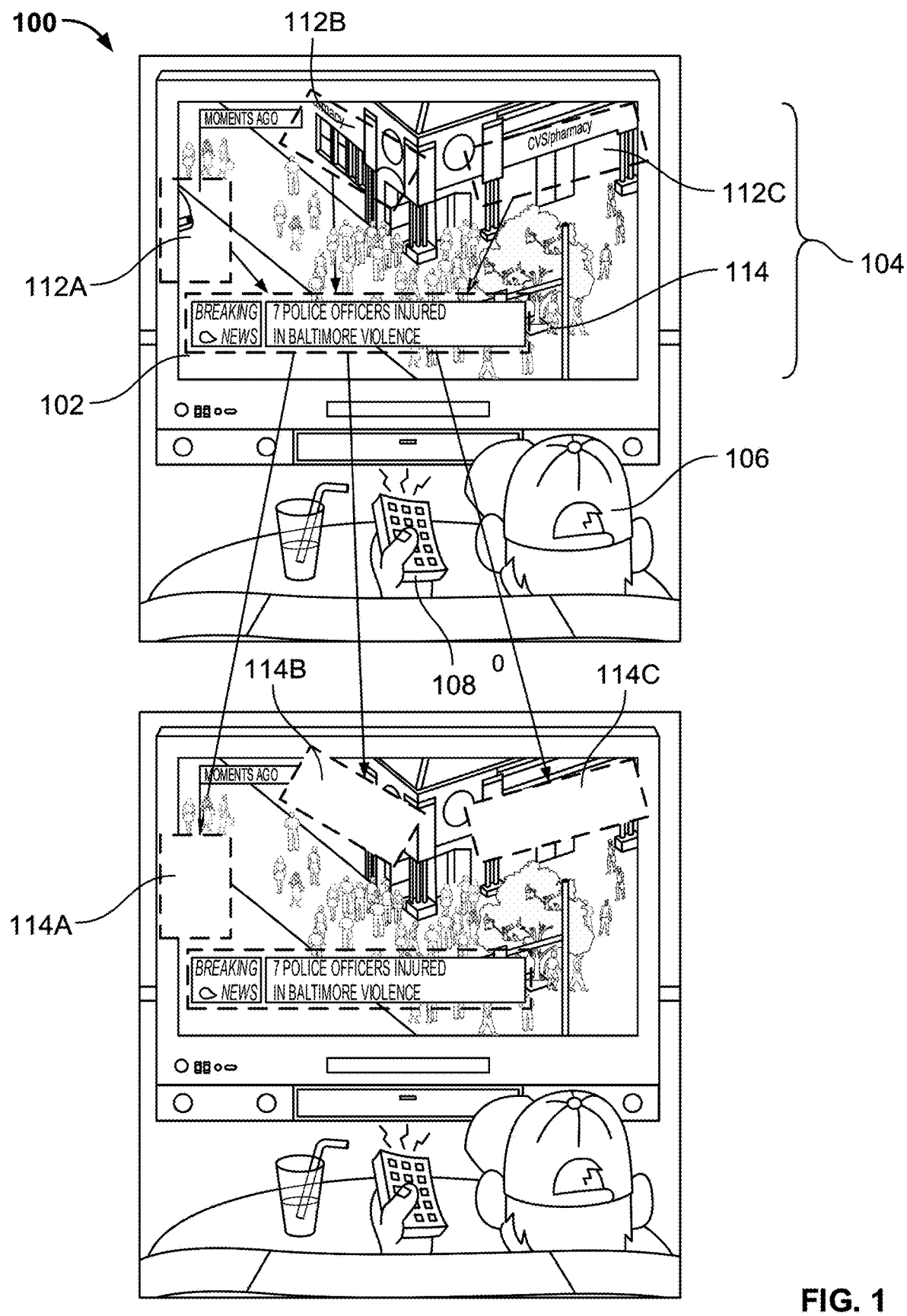
FIG. 1 illustrates a scenario in which media content comprising objectionable content is subjected to a masking action of visible entity identifiers, in accordance with some embodiments of the disclosure.

FIG. 1 depicts masking scenario 100 in which media content comprising objectionable content is subjected to a masking action of visible entity identifiers, in accordance with some embodiments of the disclosure. Although masking scenario 100 depicts certain components and illustrates certain steps, it is understood that masking scenario 100 may be executed by any or all components depicted in and described in reference to masking process 200 of FIG. 2, system 300 of FIG. 3, masking process 400 of FIG. 4, masking process 500 of FIG. 5, content item versions 600A and 600B of FIG. 6, masking process 700 of FIG. 7, masking protocols 800A-C of FIG. 8, product displays 900A-E of FIG. 9, and masking process 1000 of FIG. 10. Masking scenario 100 may also result from the execution of any or all of masking processes 200, 400, 500, 700, and 1000 of FIGS. 2, 4, 5, 7, and 10, respectively. Additionally, masking scenario 100 may result in the use or generation of content item versions 600A and 600B of FIG. 6, masking protocols 800A-C of FIG. 8, and/or product displays 900A-E of FIG. 9.

Masking or blurring a part of an image that depicts a human face, a license plate, or other identifying information that should be hidden at a time a content item is presented (e.g., to protect the identities of those involved with an incident) is known in the art. Additionally, some video-sharing sites, such as YouTube, provide users with custom blur tools that enable users to place blurs (e.g., circular) over different objects in a video, including moving objects (e.g., a car's license plate). Existing machine learning algorithms can detect and mask or blur objects based on various predefined criteria. It is common to see blurred objects in map applications that offer a feature that enables a user to view real-world images of a particular location (e.g., to simulate what a view from a particular street corner may look like). These images are processed on servers to mask the license plates on cars and blur the faces of pedestrians that appear in the pictures utilized by the mentioned applications. Masking entities (e.g., name of a shop) in content scenes with objectionable content is useful for preventing undesirable associations by customers between entities and the objectionable content. Content can be user-generated content (hereinafter "UGC") such as a video that was recorded by pedestrians witnessing a serious car accident or incident that caused casualties.

Masking scenario 100 comprises media content 102 being generated for display on display device 104. Media content 102 may comprise the mentioned UGC, may comprise a live video stream, and/or may comprise content stored in memory and retrieved for display via a media content distribution platform or service. Display device 104 is configured to respond to inputs from viewer 106 via input device 108 (e.g., a remote control). In some embodiments, viewer 106 may be able to modify the settings of display device 104 based on preferences in order to modify or override masking protocols for media content 102 as defined by a source of media content 102 (e.g., a content provider has masked aspects of the content or has decided to not mask certain aspects of the content, and viewer 106 prefers to modify the originally provided version of media content 102). In some embodiments, viewer 106 may comprise a customer of a content provider. In other embodiments, viewer 106 may comprise a system administrator or content moderator who is provided protocols for masking particular content items or masking aspects of particular content items depending on a context associated with various aspects of media content 102. Additionally, media content 102 may be processed for masking actions before or during display of media content 102 on display device 104 (e.g., upstream of a television or via a television-based modification protocol).

Media content 102 comprises context identifier 114, which comprises a string of characters corresponding to a description of the subject matter of media content 102. In some embodiments, context identifier 114 may comprise visible and non-visible metadata associated with media content 102. Context identifier 114, as shown in FIG. 1, corresponds to a description of a news story, an identifier of a news broadcast (e.g., a channel and a company name), as well as particular details of a location corresponding to the subject matter of media content 102. In some embodiments, additional information may comprise context identifier 114, including recommended ages for viewing or other media content-related descriptors that would influence the size or construction of an audience for media content 102 (e.g., an indication of whether media content 102 is available only in a localized area like a county or a state, as opposed to nationwide or internationally). Context identifier 114 is used at least in part to determine whether media content 102 comprises objectionable subject matter or a type of objectionable subject matter, and may also be used as part of an implementation of masking protocols (e.g., as represented by the exemplary protocols of FIG. 8) depending on which entities (e.g., business, logos, or products thereof) should be masked.

Entity identifiers 112A-C correspond to multiple entity identifiers in at least one frame of media content 102. For example, entity identifier 112A comprises a vehicle, which may have a vehicle manufacturer logo and/or name. In another example, entity identifier 112B corresponds to advertisements visible in a store window, where the events of media content 102 occurred. Entity identifier 112C corresponds to a sign visible in at least one frame of media content 102 that identifies a store where the events of media content 102, as indicated by content identifier 114, occurred. Each of entity identifiers 112A-C may be assigned an entity identifier type (e.g., business name, advertisement corresponding to a business, a logo, and/or a well-known phrase). Masking protocols may be retrieved, based on entity identifiers 112A-C, that consider whether any or all of the entities identified may be negatively associated with the objectionable content found in media content 102, thereby yielding a decision to mask any or all of the identifiers.

Once the masking protocols are reviewed for rationale to perform a masking action on any or all of entity identifiers 112A-C (e.g., as shown in FIG. 1, all may be masked as the incident shown involves violence against the local police, which may broadly impact the views of any entity shown in media content 102), masked identifier icons 114A-C are generated to cover up each of entity identifiers 112A-C, respectively, in each frame in which entity identifiers 112A-C are displayed. For example, masked identifier icons 114A-C may correspond to a blurring of pixels, a blackout bar, a covering graphic for at least the known iconic aspects of the entity identifier (e.g., just the logo or part of an assembly particularly associated with a brand such as a known car fascia assembly), or may comprise an alternative graphic to place instead (e.g., an alternative entity identifier if the masking protocols correspond to a replacement action of content identifiers flagged for masking due to improper licensing use).

In one embodiment, a logo detection or entity identifier obscuring service is invoked at the beginning of video playback (e.g., when viewer 106 selects media content 102 for playing as a stream or playing back as a stored content item accessible to viewer 106). An active profile corresponding to the play or playback command may be identified, which may provide additional context for performing masking actions (e.g., a location of viewer 106 and/or display device 104, and, additionally or alternatively, known associations between viewer 106 and/or display device 104 with brands via past purchases or online orders, and demographic data including allowable maturity ratings for content to be viewed). For example, a sign for a local jewelry store in a city in the state of Washington might not need to be obscured to users watching the video in a different state or country as the local jewelry store is not a widely known or recognized brand outside of a particular geographic location (e.g., a state, county, or a city).

Alternatively, if the same jewelry store was advertising online to grow its business, then the advertising was likely targeted (i.e., the advertisements were/are likely served to couples in a certain demographics, and most importantly that live near the jewelry store or may have access to the jewelry store based on a threshold distance comparison such as a three-hour transit distance). Accordingly, the advertising or target reach parameters associated with the advertisement campaign for the online services provided via the local jewelry store can serve as an indicator as to whether a specific logo or brand within the video should be obscured, and if so, which group of users should not see the logo (e.g., advertisement campaign may modify parameters to expand the audience for which a masking action is performed for the entity identifiers of the jewelry store). An entity identifier may be a logo, which may comprise any form of identifying content such as a string of text or other imagery that is generally known to a target audience as being associated with a particular entity.

Media content 102 and the aspects of media content 102 that could be subjected to such modification (i.e., obscuring a portion of the frames that depict a logo) can be identified in several ways. For example, the title of the video can be checked for keywords such as "car accident," "kidnapping," "injury," or other terms stored in a database of objectionable content, in order to identify the videos that need to run through the entity identifier (e.g., logo or brand name) detection stage or process. Similarly, the comments section or even explicit metadata such as the category of the video can be used to determine whether the video is a candidate for entity identifier masking. Video and/or audio processing algorithms that are tunable may be utilized in specific incidents (e.g., accidents, protests, violence, etc.). In some embodiments, the entity identifier may comprise a song, phrase, or segment of sound associated with media content 102 that may be masked for the purposes of obscuring the detection of the entity identifier.

Where a brand or entity identifier detection service is utilized while processing the subject matter of media content 102, the service can generate a list of brands that appear in a video, the time a brand appears and/or the segment number (e.g., which frames). A severity factor can also be assigned. The severity factor is an indication of how disturbing the content in the video is. The severity factor may be based on whether the video is trending, share rate, profiles sharing (e.g., sharing of media content 102 by social media influencers may be assigned a higher severity factor than sharing of media content 102 by social media users without an influencer designation), and/or view rate. This information can be saved in a data structure and can be used to enable on-the-fly masking of a specific logo from among multiple entity identifiers.

The detected entity identifiers are further augmented with metadata to enable efficient and quick masking to occur upon video playback. For example, if a logo of an international brand was detected (e.g., Pepsi), then such logo would be assigned the value "International." Alternatively, a brand or logo for a doughnut shop that is only available in a certain country, such as the U.S., can be assigned the value "Domestic-U.S.," or "Domestic-Europe,' if the brand is exclusive to Europe. The user's profile can be used to determine whether there's an association with the brand. In one embodiment, the length of time that the brand appears is also determined. For example, a brand name soda logo might appear in the background of a picture in just a handful of frames (e.g., seen in less than 1 second of the total content). Depending on the severity factor assigned to the video, the brand name soda logo might not need to be obscured.

In one embodiment, a second copy of the video is created that has the logo/brand blurred, and the determination regarding which copy to serve to a user occurs when the user requests to watch the video. Similarly, since some apps/websites auto play content on the "For You" page, then the player fetches portions to auto play from the original version or the modified version. In one embodiment, logos/brands are obscured in videos that do not depict violence at all. For example, it is common to see obscured logos or trademarks (e.g., on clothes worn by artists) in music videos. This is because the music label wants compensation for promoting such brands, especially if the artist is popular. A famous artist wearing a Supreme Hoodie is generally considered a display of a product, and often results in free advertisement for Supreme depending on who wears the product and at what events. In such scenarios, presenting a version of the video with the unmasked brand is used as an advertising medium. For example, an ad network might determine that a user watching the music video is a Supreme customer (e.g., has purchased Supreme products before), and based on its communication with the playback service, instructs the playback service to present an unmodified version of the video. The content owner can therefore be compensated for showing the unmodified version, since doing so is equivalent to serving an ad within the video or a display ad near the playback device. The playback service can make such information available to the ad network, i.e., which brand is obscured but can be unobscured for the right audiences or users, as in-content advertising.

Figure 2:
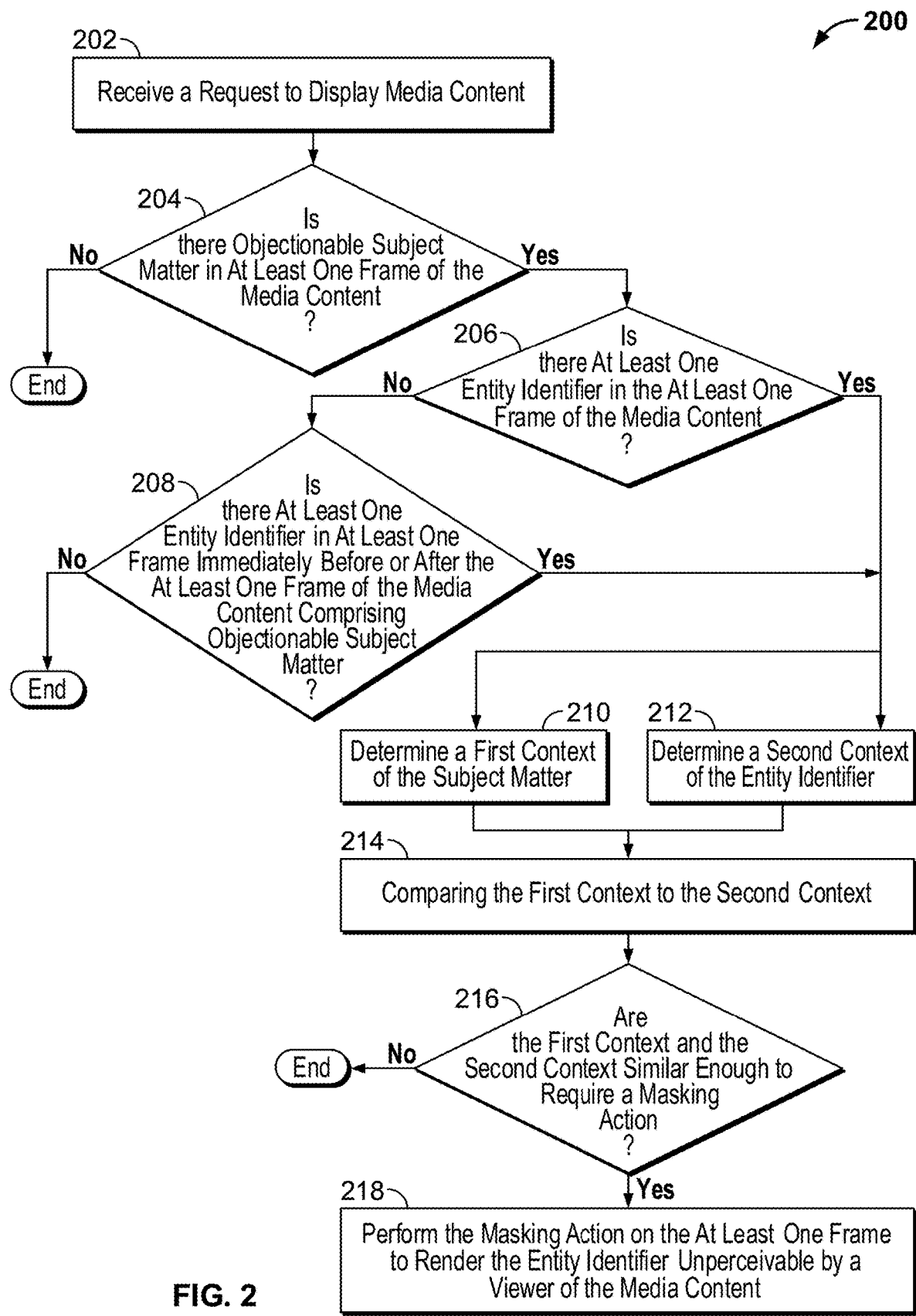
FIG. 2 is a flowchart representing an illustrative process for determining whether an entity identifier is visible within a content item comprising objectionable content and whether the entity identifier should be subjected to a masking action, in accordance with some embodiments of the disclosure.

FIG. 2 depicts masking process 200, which comprises an illustrative process for determining whether an entity identifier is visible within a content item comprising objectionable content and whether the entity identifier should be subjected to a masking action, in accordance with some embodiments of the disclosure. It is understood that masking process 200 may be executed by any or all components depicted in and described in reference to masking scenario 100 of FIG. 1, system 300 of FIG. 3, masking process 400 of FIG. 4, masking process 500 of FIG. 5, content item versions 600A and 600B of FIG. 6, masking process 700 of FIG. 7, masking protocols 800A-C of FIG. 8, product displays 900A-E of FIG. 9, and masking process 1000 of FIG. 10. Masking process 200 may also incorporate, during execution, any or all of masking processes 400, 500, 700, and 1000 of FIGS. 4, 5, 7, and 10, respectively, in whole or in part. Additionally, masking process 200 may result in the use or generation of content item versions 600A and 600B of FIG. 6, masking protocols 800A-C of FIG. 8, and/or product displays 900A-E of FIG. 9.

At 202, a request to display media content is received. For example, a viewer may provide an input via a remote device, a controller device, an audio receptor, or other means associated with a particular device configured to dispel media content. If, at 204, objectionable subject matter is not found in at least one frame of the media content (NO at 204), then the process ends. If objectionable subject matter is found in at least one frame of the media content YES at 204), then the at least one frame of the media content is reviewed for entity identifiers. As discussed in reference to FIG. 1, objectionable subject matter may be predefined by any of a user, a content source, a content distributor, or by any metadata accessible via communicatively connected devices such as social media content or metadata encoded to be associated with individual frames of media content. If, at 206, at least one entity identifier is not identified in the at least one frame of the media content (NO at 206), then frames of the media content immediately preceding or following the at least one frame with the objectionable content are reviewed at 208 for content identifiers. For example, a news clip may not show a crime scene in a frame with an entity identifier. However, the news commentators may verbalize an entity identifier immediately prior to or immediately after describing the crime scene, which may lead to undesirable associations by viewers. If, at 208, there are no entity identifiers in the frames immediately prior to or immediately after the at least one frame comprising the objectionable content (NO at 208), then the process ends as no masking actions are required.

If, at 206, at least one entity identifier is identified in the at least one frame of the media content (YES at 206), then a first context of the subject matter of the media content is determined (e.g., details of the objectionable content are identified based on metadata and/or video analysis as cross referenced with a masking protocol to identify industries and entities potentially adversely affected by the objectionable content as well as the reach of the content item in terms of geographic location) at 210 while a second context of the entity identifier (e.g., an industry, a target audience for advertisements, a geographic reach of the entity identifier, or another other related variable is determined for cross referencing with a masking protocol to determine if the adverse subject matter may adversely affect the entity identifier) at 212. At 214, the first context of the subject matter of the media content is compared to the second context of the entity identifier (e.g., a comparison is made between context data to verify if, for example, industries are related and the first context may yield a negative view of the identifier with the second context as defined by masking protocols, like those shown in FIG. 8).

At 216, if the first context and the second context are not similar enough to require a masking action (NO at 216), then the process ends as no masking action is required to prevent a negative association between the subject matter of the media content and the content identifier. If the first context and the second context are similar enough to require a masking action of the entity identifier (YES at 216), then a masking action is performed on the at least one frame to render the entity identifier unperceivable by a viewer of the media content at 218 (e.g., as shown in FIGS. 6 and 9). The comparison may comprise a listing of content elements and a threshold amount of the elements must match or must be significantly related. For example, the handheld device industry and the vehicle industry may both be adversely affected by a car accident where a handheld device was known to be used prior to the events of the accident. However, a brand of clothing may not be adversely affected by the imagery of the car accident. Each of the relationships may be based on exemplary masking protocols as shown in FIG. 8 or may be a result of a form of machine learning to train a masking algorithm based on newer or previously unknown negative associations between related entity identifiers and industries, as shown in FIG. 10. In some examples, the masking at 218 is performed by digitally manipulating at least a portion of a frame and/or related sections or locations (e.g., specific or related macroblocks)

in subsequent frames as well (e.g., when the decoding of a frame depends on other frames). Additionally, obscuring an object or identifier in one part of the video, in some aspects, will cause it to be obscured in other parts of the video (e.g., if it appears again 5 minutes later).

Figure 3:
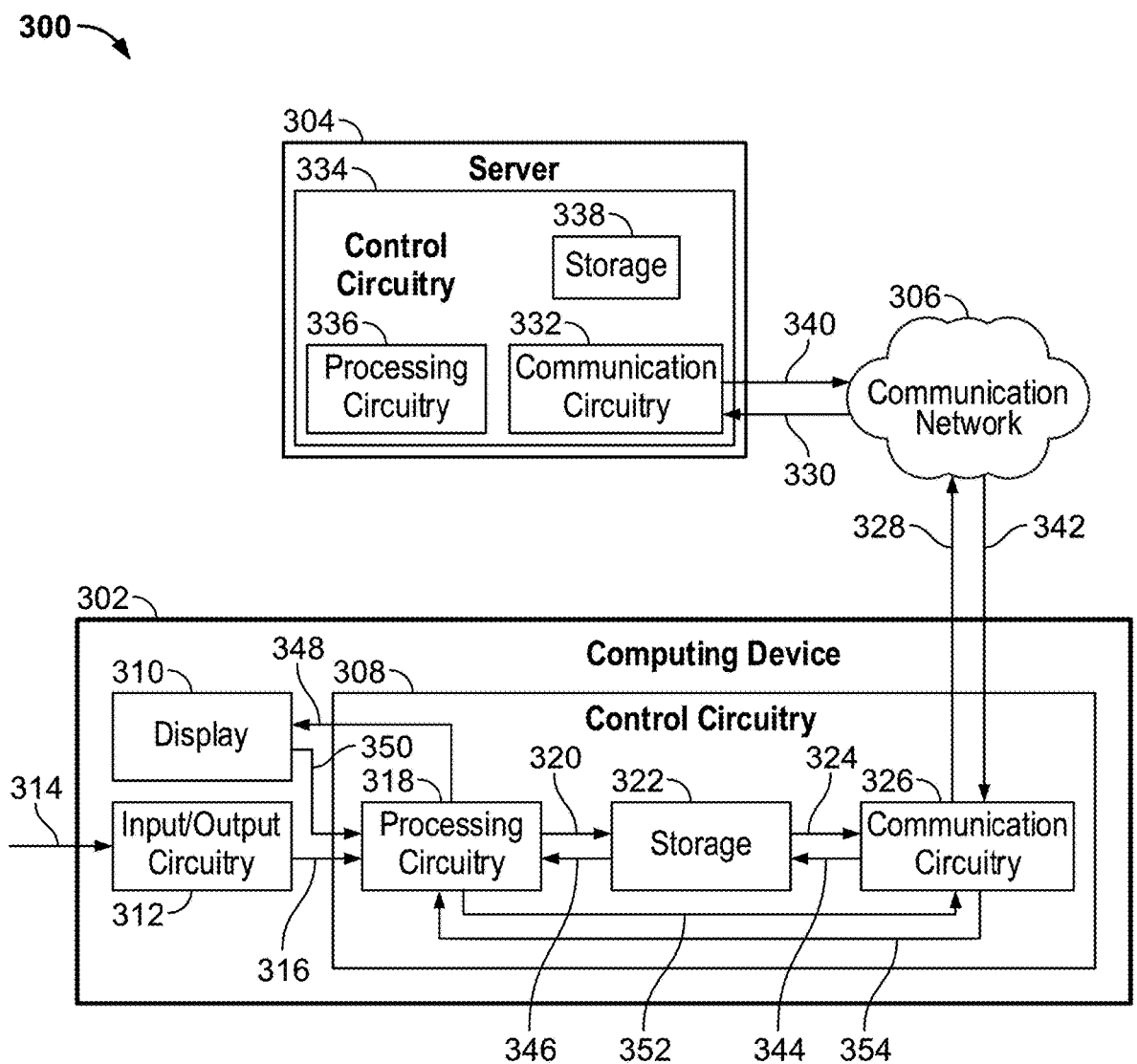
FIG. 3 is a block diagram of a system configured to selectively mask entity identifiers displayed in objectionable content, in accordance with some embodiments of the disclosure.

FIG. 3 is a block diagram of system 300, which is configured to mask entity identifiers in media content comprising objectionable content that is generated for display on display 310 of a computing device (e.g., computing device 302) in response to determining masking protocols require masking of entity identifiers based on a contextual analysis, in accordance with some embodiments of the disclosure. In some embodiments, one or more parts of or the entirety of system 300 may be configured as a system implementing various features, processes, and components of FIGS. 1, 2, and 4-10. Although FIG. 3 shows a certain number of components, in various examples, system 300 may include fewer than the illustrated number of components and/or multiples of one or more of the illustrated number of components (e.g., multiple iterations of computing device 302 for each device in the system with a display and or multiple iterations of server 304).

The interactive system is shown to include computing device 300, content server 302, and a communication network 306. It is understood that while a single instance of a component may be shown and described relative to FIG. 3, additional instances of the component may be employed. For example, content server 302 may include, or may be incorporated in, more than one server. Similarly, communication network 306 may include, or may be incorporated in, more than one communication network. Content server 302 is shown communicatively coupled to computing device 300 through communication network 306. While not shown in FIG. 3, content server 302 may be directly communicatively coupled to computing device 300, for example, in a system absent or bypassing communication network 306.

Communication network 306 may comprise one or more network systems, such as, without limitation, Internet, LAN, WIFI or other network systems suitable for audio processing applications. In some embodiments, the system of FIG. 3 excludes content server 302, and functionality that would otherwise be implemented by content server 302 is instead implemented by other components of the system depicted by FIG. 3, such as one or more components of communication network 306. In still other embodiments, content server 302 may work in conjunction with one or more components of communication network 306 to implement certain functionality described herein in a distributed or cooperative manner. Similarly, in some embodiments, the system depicted by FIG. 3 excludes computing device 300, and functionality that would otherwise be implemented by computing device 300 is instead implemented by other components of the system depicted by FIG. 3, such as one or more components of communication network 306 or content server 302 or a combination of the same. In other embodiments, computing device 300 works in conjunction with one or more components of communication network 306 or content server 302 to implement certain functionality described herein in a distributed or cooperative manner.

Computing device 300 includes control circuitry 308, display circuitry 310 and input/output circuitry 312. Control circuitry 308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 308 in turn includes transceiver circuitry 314, storage 316 and processing circuitry 318. In some embodiments, computing device 300 or control circuitry 308 may be configured as varying embodiments of audio/video user entertainment system 100 of FIG. 1.

In addition to control circuitry 308 and 320, computing device 300, content server 302, may each include storage (storage 316 and storage 322, respectively). Each of storages 316 and 322 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 316 and 322 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 316 and 322 or instead of storages 316 and 322. In some embodiments, the user profile activity history, user profile preferences, and accessible media content may be stored in one or more of storages 316 and 322.

In some embodiments, control circuitry 320 and/or 308 executes instructions for an application stored in memory (e.g., storage 322 and/or storage 316). Specifically, control circuitry 320 and/or 308 may be instructed by the application to perform the functions discussed herein. In some implementations, any action performed by control circuitry 320 and/or 308 may be based on instructions received from the application. For example, the application may be implemented as software or a set of executable instructions that may be stored in storage 322 and/or 316 and executed by control circuitry 320 and/or 308. In some embodiments, the application may be a client/server application where only a client application resides on computing device 300, and a server application resides on content server 302.

The application may be implemented using any suitable architecture. For example, it may be a stand-alone application wholly implemented on computing device 300. In such an approach, instructions for the application are stored locally (e.g., in storage 316), and data for use by the application is downloaded on a periodic basis (e.g., from an out-of-band feed, from an Internet resource, or using another suitable approach). Control circuitry 308 may retrieve instructions for the application from storage 316 and process the instructions to perform the functionality described herein. Based on the processed instructions, control circuitry 308 may determine to execute elements of the embodiments of this disclosure in response to input received from input/output circuitry 312 or from communication network 306. For example, in response to a user providing inputs to activate entertainment system 100, control circuitry 308 may perform the steps of any of the processes depicted in FIGS. 1, 2, and 4-11B, or processes relative to various embodiments.

In client/server-based embodiments, control circuitry 308 may include communication circuitry suitable for communicating with an application server (e.g., content server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 306). In another example of a client/server-based application, control circuitry 308 runs a web browser that interprets web pages provided by a remote server (e.g., content server 302). For example, the remote server may store the instructions for the application in a storage device. The remote server may process the stored instructions using circuitry (e.g., control circuitry 308) and/or generate displays. Computing device 300 may receive the displays generated by the remote server and may display the content of the displays locally via display circuitry 310. This way, the processing of the instructions is performed remotely (e.g., by content server 302) while the resulting displays, such as the display windows described elsewhere herein, are provided locally on computing device 300. Computing device 300 may receive inputs from the user via input/output circuitry 312 and transmit those inputs to the remote server for processing and generating the corresponding displays. Alternatively, computing device 300 may receive inputs from the user via input/output circuitry 312 and process and display the received inputs locally, by control circuitry 308 and display circuitry 310, respectively.

Content server 302 and computing device 300 may transmit and receive content and data such as media content via communication network 306. For example, content server 302 may be a media content provider, and computing device 300 may be a smart television configured to download or stream media content, such as a live news broadcast, from content server 302. Control circuitry 320, 308 may send and receive commands, requests, and other suitable data through communication network 306 using transceiver circuitry 342, 314, respectively. Control circuitry 320, 308 may communicate directly with each other using transceiver circuitry 342, 314, respectively, avoiding communication network 306.

It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Control circuitry 320 and/or 308 may be based on any suitable processing circuitry such as processing circuitry 328 and/or 318, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 308 are configured to implement a media content operation system, such as systems, or parts thereof, that perform various processes described and shown in connection with FIGS. 1, 2, and 4-11B, and/or systems carrying out the features described and shown relative to FIGS. 1, 2, and 4-11B.

Computing device 300 receives user input 332 at input/output circuitry 312. For example, computing device 300 may receive a user input such as a user swipe or user touch, as previously discussed. In some embodiments, computing device 300 is a media device (or player) configured as entertainment system 100, with the capability to access media content. It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 332 may be received from a user selection-capturing interface that is separate from device 300, such as a remote-control device, trackpad or any other suitable user movement sensitive or capture devices, or as part of device 302, such as a touchscreen of display circuitry 310. Transmission of user input 332 to computing device 300 may be accomplished using a wired connection, such as an audio cable, USB cable, ethernet cable or the like attached to a corresponding input port at a local device, or may be accomplished using a wireless connection, such as Bluetooth, WiFi, WiMAX, GSM, UTMS, CDMA, TDMA, 3G, 4G, 4G LTE, 5G, or any other suitable wireless transmission protocol. Input/output circuitry 312 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WiFi, WiMAX, GSM, UTMS, CDMA, TDMA, 3G, 4G, 4G LTE, 5G, or other wireless transmission protocols.

Processing circuitry 318 may receive user input 332 from input/output circuitry 312 using communication path 334. Processing circuitry 318 may convert or translate the received user input 332 which may be in the form of gestures or movement, to digital signals. In some embodiments, input/output circuitry 312 performs the translation to digital signals. In some embodiments, processing circuitry 318 (or processing circuitry 328, as the case may be) carries out disclosed processes and methods. For example, processing circuitry 318 or processing circuitry 328 may perform processes of FIGS. 1, 2, and 4-11B, respectively.

Processing circuitry 318 may provide requests to storage 316 by communication path 336. Storage 316 may provide requested information to processing circuitry 318 by communication path 338. Storage 316 may transfer, by communication path 338, a request for information to transceiver circuitry 314, which may translate or encode the request for information to a format receivable by communication network 306 before transferring the request for information by communication path 340. Communication network 306 may forward the translated or encoded request for information to transceiver circuitry 342 by communication path 346.

At transceiver circuitry 342, the translated or encoded request for information, received through communication path 346, is translated or decoded for processing circuitry 328, which will provide a response to the request for information (e.g., additional activities associated with an event) based on information available through control circuitry 320 or storage 322, or a combination thereof. The response to the request for information is then provided back to communication network 306 by communication path 350 in an encoded or translated format such that communication network 306, which can forward the encoded or translated response back to transceiver circuitry 314 by communication path 352.

At transceiver circuitry 314, the encoded or translated response to the request for information may be provided directly back to processing circuitry 318 by communication path 356, or may be provided to storage 316, through communication path 358, which then provides the information to processing circuitry 318 by communication path 360. Processing circuitry 318 may also provide a request for information directly to transceiver circuitry 314 though communication path 362, enabling storage 316 to respond to an information request, provided through communication 336, by communication path 360 that storage 316 does not contain information pertaining to the request from processing circuitry 318.

Processing circuitry 318 may process the response to the request received through communication path 356 or 360 and may provide instructions to display circuitry 310 for a notification to be provided to the users through communication path 364. Display circuitry 310 may incorporate a timer for providing the notification or may rely on inputs through input/output circuitry 312 from the user, which are forwarded through processing circuitry 318 through communication path 364, to determine how long or in what format to provide the notification. When display circuitry 310 determines the display has been completed (e.g., media content has completed a playback time or a user has exited out of a recommendation), a notification may be provided to processing circuitry 310 through communication path 366.

The communication paths provided in FIG. 3 between computing device 300, content server 302, communication network 306, and all subcomponents depicted are exemplary and may be modified to reduce processing time or enhance processing capabilities for each step in the processes disclosed herein by one skilled in the art.

Figure 4:
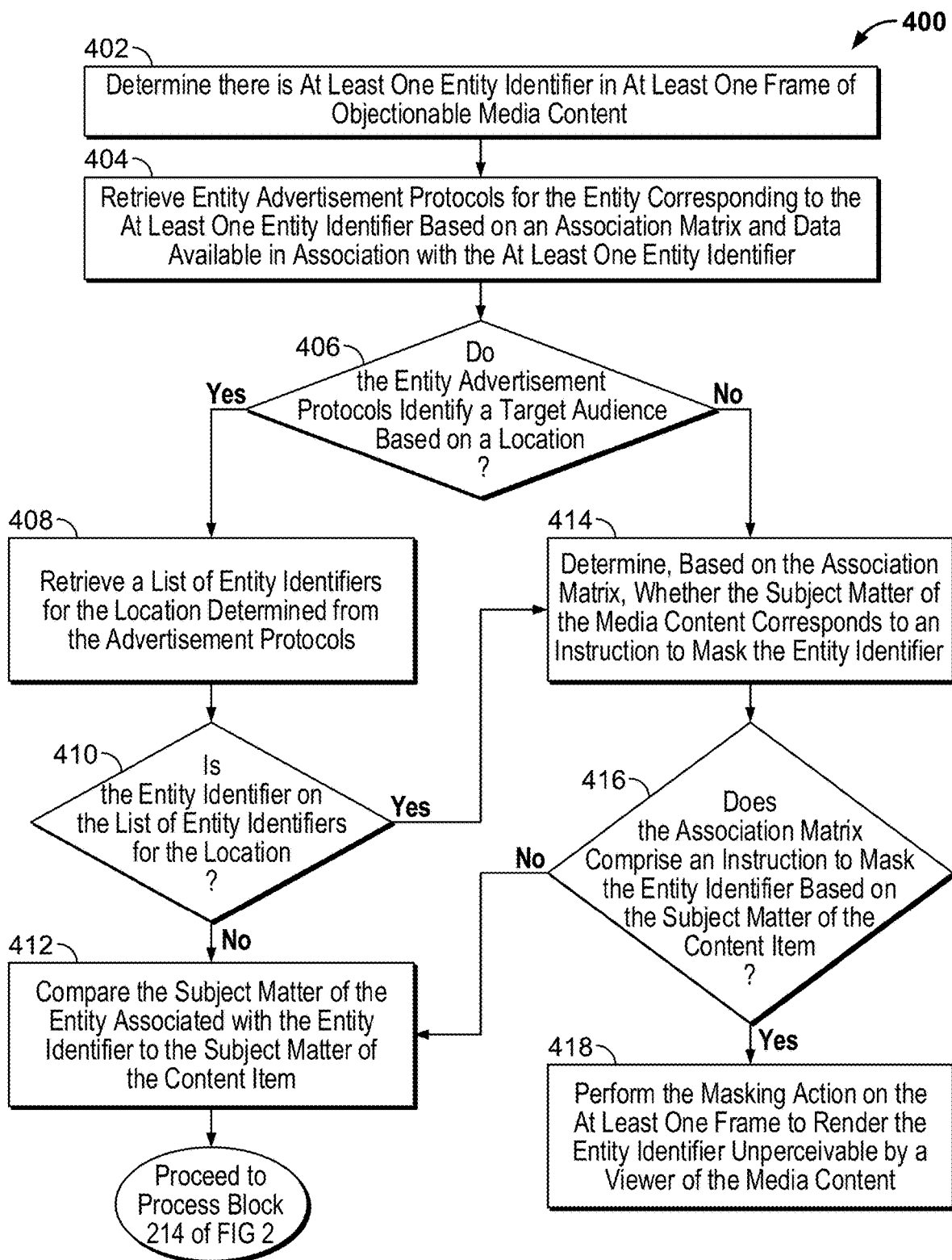
FIG. 4 is a flowchart representing an illustrative process for selectively masking entity identifiers based on a location, in accordance with some embodiments of the disclosure.

FIG. 4 depicts masking process 400, which comprises an illustrative process for selectively masking entity identifiers based on a location, in accordance with some embodiments of the disclosure. It is understood that masking process 400 may be executed by any or all components depicted in and described in reference to masking scenario 100 of FIG. 1, masking process 200 of FIG. 2, system 300 of FIG. 3, masking process 500 of FIG. 5, content item versions 600A and 600B of FIG. 6, masking process 700 of FIG. 7, masking protocols 800A-C of FIG. 8, product displays 900A-E of FIG. 9, and masking process 1000 of FIG. 10. Masking process 400 may also incorporate, during execution, any or all of masking processes 200, 500, 700, and 1000 of FIGS. 2, 5, 7, and 10, respectively, in whole or in part. Additionally, masking process 400 may result in the use or generation of content item versions 600A and 600B of FIG. 6, masking protocols 800A-C of FIG. 8, and/or product displays 900A-E of FIG. 9.

At 402, at least one entity identifier is determined to be present or visible by a viewer in objectionable media content. At 404, entity advertisement protocols corresponding to the entity associated with the at least one entity identifier are retrieved based on an association matrix (e.g., a matrix comprising a list of business entities and entity identifiers for each business entity with corresponding masking protocols) and other data available in association with the at least one entity identifier. For example, the advertisement protocols may comprise a target audience and/or a geographic region of the intended reach of advertisements for the entity. Additional data may comprise a current list of content considered objectionable (e.g., based at least in part on social media trends) at the time masking process 400 commences. If, at 406, the entity advertisement protocols identify a target location based on a location (YES at 406), then a list of entity identifiers for the location are determined from the advertisement protocols at 408. If, at 410, the entity identifier is not on the list of entity identifiers for the location (NO at 410), then the subject matter of the entity associated with the entity identifier (e.g., its industry and/or the location of its primary business) is compared to the subject matter of the content item (e.g., to determine if the subject matter of the content item is objectionable when viewed with the entity identifier) at 412. The process then proceeds to process block 214 of FIG. 2 to complete the masking process analysis. If, at 410, the entity identifier is on the list of entity identifiers for the location (YES at 410), then an association matrix for the entity corresponding to the entity identifier is utilized to determine whether the subject matter of the media content corresponds to an instruction to mask the entity identifier at 414.

Additionally, if, at 406, the entity advertisement protocols do not identify a target audience based on the location (NO at 406), then an association matrix (e.g., as shown in FIG. 8) for the entity corresponding to the entity identifier is utilized to determine whether the subject matter of the media content corresponds to an instruction to mask the entity identifier at 414. If, at 416, the association matrix does not comprise an instruction to mask the entity identifier based on the subject matter of the content item (NO at 416), then the subject matter of the entity associated with the entity identifier (e.g., its industry and/or the location of its primary business) is compared to the subject matter of the content item (e.g., to determine if the subject matter of the content item is objectionable when viewed with the entity identifier) at 412. The process then proceeds to process block 214 of FIG. 2 to complete the masking process analysis. If, at 416, the association matrix does comprise an instruction to mask the entity identifier based on the subject matter of the content item (YES at 416), then a masking action is performed on the at least one frame to render the entity identifier unperceivable by a viewer of the media content at 418 (e.g., as shown in FIGS. 6 and 9). In some examples, the masking at 418 is performed by digitally manipulating at least a portion of a frame and/or related sections or locations (e.g., specific or related macroblocks) in subsequent frames as well (e.g., when the decoding of a frame depends on other frames). Additionally, obscuring an object or identifier in one part of the video, in some aspects, will cause it to be obscured in other parts of the video (e.g., if it appears again 5 minutes later). Additionally or alternatively, a related object or identifier (e.g., a different object associated with the same brand) may be unmasked in some aspects.

Figure 5:
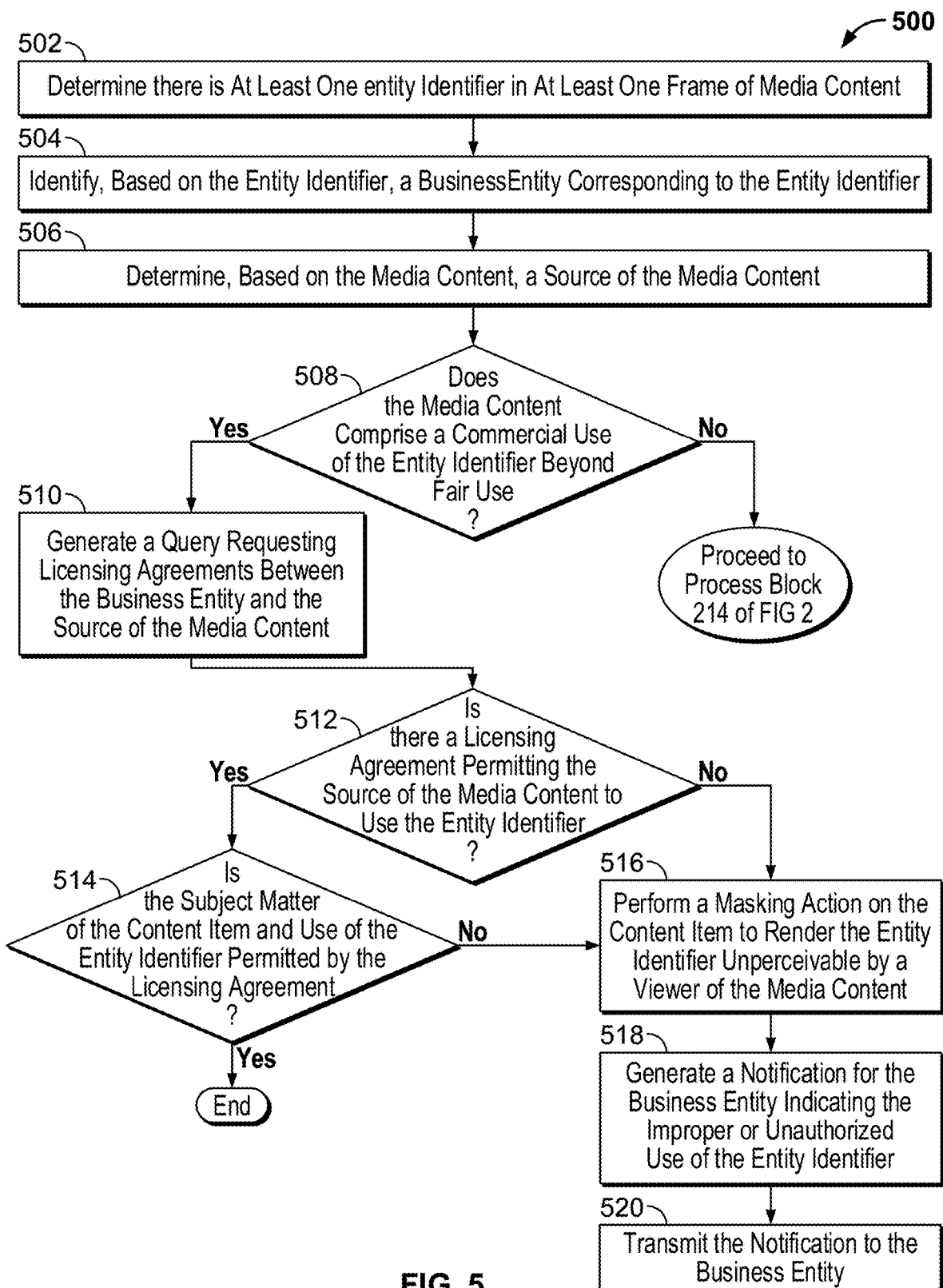
FIG. 5 is a flowchart representing an illustrative process for selectively masking entity identifiers based on a licensing agreement, in accordance with some embodiments of the disclosure.

FIG. 5 depicts masking process 500, which comprises an illustrative process for selectively masking entity identifiers based on a licensing agreement, in accordance with some embodiments of the disclosure. It is understood that masking process 500 may be executed by any or all components depicted in and described in reference to masking scenario 100 of FIG. 1, masking process 200 of FIG. 2, system 300 of FIG. 3, masking process 400 of FIG. 4, content item versions 600A and 600B of FIG. 6, masking process 700 of FIG. 7, masking protocols 800A-C of FIG. 8, product displays 900A-E of FIG. 9, and masking process 1000 of FIG. 10. Masking process 500 may also incorporate, during execution, any or all of masking processes 200, 400, 700, and 1000 of FIGS. 2,4, 7, and 10, respectively, in whole or in part. Additionally, masking process 500 may result in the use or generation of content item versions 600A and 600B of FIG. 6, masking protocols 800A-C of FIG. 8, and/or product displays 900A-E of FIG. 9.

At 502, at least one entity identifier in at least one frame of media content is determined to be present and viewable by a viewer of the media content. At 504, a business entity corresponding to the entity identifier is identified. At 506, a source of the media content is identified based on the media content (e.g., based on metadata describing the origins of the media content prior to display). If, at 508, the media content does not comprise commercial use of the entity identifier beyond fair use, such as merely describing a source of a product, (NO at 508), then the process proceeds to process block 214 of FIG. 2 to determine if there is a risk for an objectionable association between the entity identifier and the media content. If, at 508, the media content does comprise commercial use of the entity identifier beyond fair use, such as convoluting or misrepresenting a source of a product or message associated with a product, (YES at 508), then a query requesting licensing agreements between the business entity and the source of the media content is generated at 510. For example, respective commercial agreement administrators for each of the business entity and the source of the media content may be queried for proof of bilaterally adopted commercial licensing agreements between the two parties.

If, at 512, it is determined there is a licensing agreement permitting the source of the media content to use the entity identifier (YES at 512), then the subject matter of the content item is compared to the use parameters defined in the licensing agreement at 514. If, at 514, the use of the entity identifier and the subject matter of the content item are within the permitted parameters of the licensing agreement (YES at 514), then the process ends, as no masking action is required. Alternatively, if, at 512, there is no licensing agreement permitting the source of the media content to use the entity identifier (NO at 512), or if, at 514, the subject matter of the content item and the use of the entity identifier are outside the parameters of an executed licensing agreement (NO at 514), then a masking action is performed on the at least one frame to render the entity identifier unperceivable by a viewer of the media content at 516 (e.g., as shown in FIGS. 6 and 9). At 518, a notification for the business entity indicating improper or unauthorized use of the entity identifier is generated. At 520, the notification is transmitted to the business entity (e.g., the legal team of the business entity may be contacted to address the improper or unauthorized use of the entity identifier).

FIG. 6 depicts content item versions 600A and 600B, wherein content item version 600A comprises unmasked entity identifiers and content item version 600B comprises a second version of the same content item with masked entity identifiers, in accordance with some embodiments of the disclosure. Each of content item versions 600A and 600B may be generated by any or all components depicted in and described in reference to masking scenario 100 of FIG. 1, masking process 200 of FIG. 2, system 300 of FIG. 3, masking process 400 of FIG. 4, masking process 500 of FIG. 5, masking process 700 of FIG. 7, masking protocols 800A-C of FIG. 8, product displays 900A-E of FIG. 9, and masking process 1000 of FIG. 10. Each of content item versions 600A and 600B may be generated as a result of the execution of any or all of masking processes 200, 500, 700, and 1000 of FIGS. 2,5, 7, and 10, respectively, in whole or in part. Content item versions 600A and 600B may be generated by using masking protocols 800A-C of FIG. 8 and/or may be generated by incorporating aspects of product displays 900A-E of FIG. 9.

Each of content item versions 600A and 600B comprise display 602, which is configured to generate for display media content 604. Media content 604 may, for example, be a music video with readily identifiable individuals or entities associated with individuals. Media content 604 may be subjected to video, audio, and/or metadata analysis to identify a source of the music video (e.g., an artist, a studio, a production company, or a media distribution platform). Based on the analysis, the identified source of the video as well as at least one entity identifier may be used to generate a query to businesses associated with the identified source of the video and the at least one entity identifier for proof of licensing agreements (e.g., as described in reference to masking process 700 of FIG. 7). As shown in FIG. 6, entity identifier 606 corresponds to a drink product visible in media content 604, being held by an individual associated with media content 604. Content item version 600A corresponds to a version of media content 604 wherein entity identifier 606 does not need to be masked based on a determination that the use of entity identifier 606 corresponds a form of fair use or, as described in reference to FIG. 7, a licensing agreement outlining either the use of entity identifier 606 is permitted or the current location of the streaming of media content 604 does not conflict with an existing licensing agreement. Content item version 600B corresponds to a version of media content 604 where entity identifier 606 is obscured, masked, or covered via masked icon 608. For example, the use of entity identifier 606 may violate an existing licensing agreement, or an entity associated with media content 604 may lack a valid licensing agreement to use entity identifier 606 in the manner corresponding to media content 604, resulting in the entity associated with entity identifier 606 requesting or requiring the generation of content item version 600B, in parallel to the generation of content item version 600A, where the use of entity identifier 606 is in question.

Figure 7:
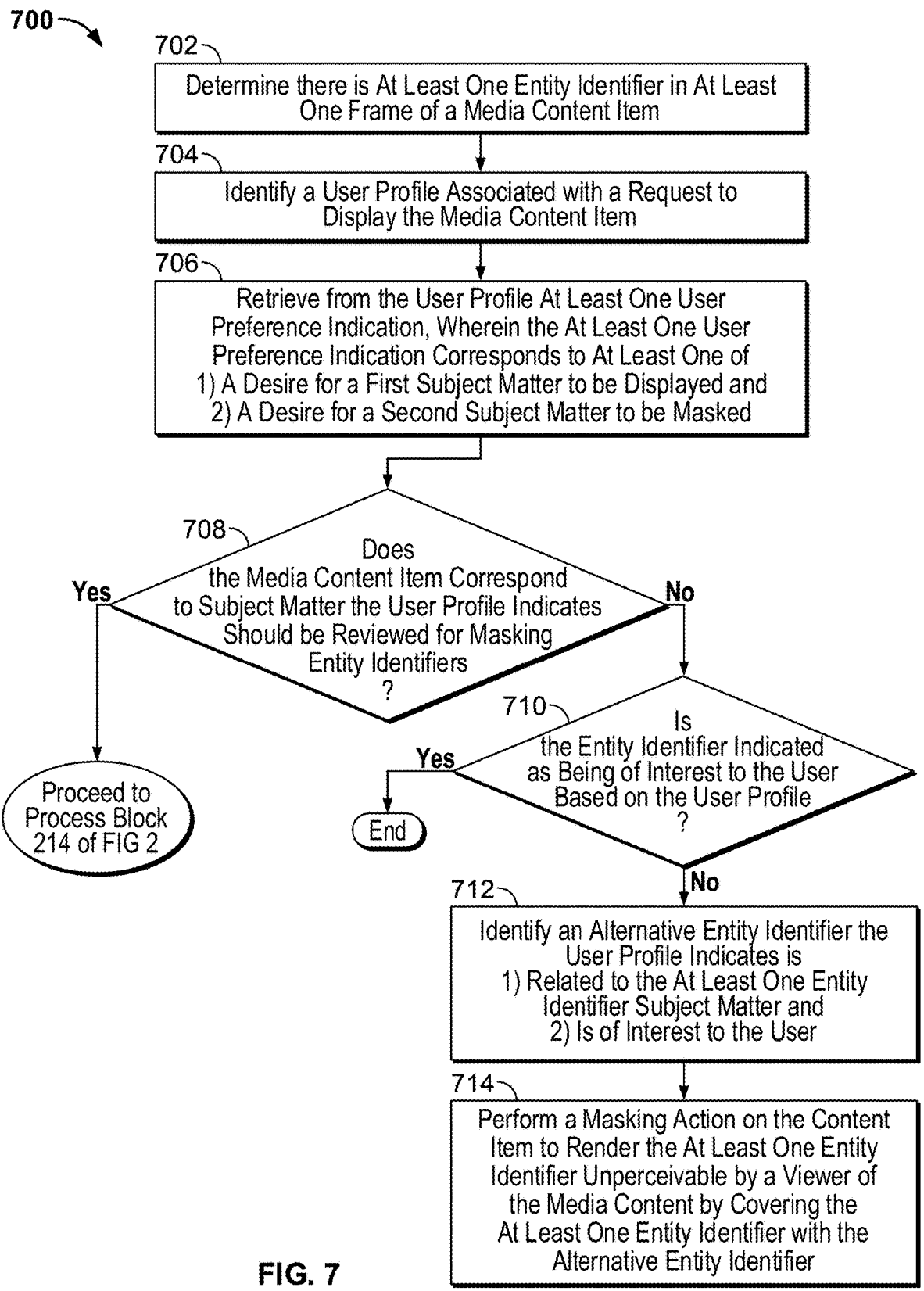
FIG. 7 is a flowchart representing an illustrative process for selectively masking entity identifiers based on a profile associated with at least one content platform, in accordance with some embodiments of the disclosure.

FIG. 7 depicts masking process 700, which comprises an illustrative process for selectively masking entity identifiers based on a profile associated with at least one content platform, in accordance with some embodiments of the disclosure. It is understood that masking process 700 may be executed by any or all components depicted in and described in reference to masking scenario 100 of FIG. 1, masking process 200 of FIG. 2, system 300 of FIG. 3, masking process 400 of FIG. 4, masking process 500 of FIG. 5, content item versions 600A and 600B of FIG. 6, masking protocols 800A-C of FIG. 8, product displays 900A-E of FIG. 9, and masking process 1000 of FIG. 10. Masking process 700 may also incorporate, during execution, any or all of masking processes 200, 400, 500, and 1000 of FIGS. 2,4, 5, and 10, respectively, in whole or in part. Additionally, masking process 700 may result in the use or generation of content item versions 600A and 600B of FIG. 6, masking protocols 800A-C of FIG. 8, and/or product displays 900A-E of FIG. 9.

At 702, at least one entity identifier is determined to be present and visible by viewers of media content in at least one frame of the media content. At 704, a user profile is identified in association with a request to display the media content item. For example, the media content may be requested by a user of a subscription-based content provider, which tracks user viewing and activity histories, or an administrator of a content platform may be configured to address perception of entities visible in various content items available via the content platform (e.g., a masking service paid by entities to address potential risks for objectionable associations). At 706, at least one user preference indication, wherein the at least one user preference indication corresponds to at least one of 1) a desire for a first subject matter to be displayed and 2) a desire for a second subject matter to be masked, is retrieved from the user profile.

If, at 708, the media content item is determined to correspond to subject matter the user profile indicates should be reviewed for masking of visible entity identifiers (YES at 708), the process proceeds to process block 214 of FIG. 2 to determine if there is a risk for an objectionable association between the entity identifier and the media content. If, at 708, the media content item is not determined to correspond to subject matter the user profile indicates should be reviewed for masking of visible entity identifiers (NO at 708), then the user profile is reviewed for data indicative of interest in the entity identifier at 710. For example, the user profile may comprise a purchase history of the user, and masking process 700 may be used at least in part for product placement in modifiable media content to replace brands or entity identifiers not of interest to the user with entity identifiers of interest to the user (e.g., masking a visible soda brand of a first label with a second label of a different drink, such as a flavored water, or different soda brand the user purchases or has considered purchasing). If, at 710, the entity identifier is indicated as being of interest to the user based on the user profile (YES at 710), then the process ends as no masking action is required. If, at 710, the entity identifier is indicated as not being of interest to the user based on the user profile (NO at 710), then an alternative entity identifier that the user profile indicates is 1) related to the at least one entity identifier subject matter and 2) of interest to the user is identified at 712. At 714, a masking action on the content item, to render the at least one entity identifier unperceivable by a viewer of the media content by covering the at least one entity identifier with the alternative entity identifier, is performed (e.g., a first label or product is covered by a second or preferred label or product).

FIG. 8 depicts association matrices 800A-C, which are used to determine whether entity identifiers should be masked based on the subject matter of a content item in which the entity identifiers are present, in accordance with some embodiments of the disclosure. Each of association matrices 800A-C may be generated by any or all components depicted in and described in reference to masking scenario 100 of FIG. 1, masking process 200 of FIG. 2, system 300 of FIG. 3, masking process 400 of FIG. 4, masking process 500 of FIG. 5, content item versions 600A and 600B of FIG. 6, masking process 700 of FIG. 7, product displays 900A-E of FIG. 9, and masking process 1000 of FIG. 10. Each of association matrices 800A-C may be generated as a result of the execution of any or all of masking processes 200, 400, 500, 700, and 1000 of FIGS. 2,4, 5, 7, and 10, respectively, in whole or in part. Association matrices 800A-C may be utilized in determining which of product displays 900A-E of FIG. 9 to generate.

Association matrices 800A-C each correspond to different entities, lists of identifiers, and a list of objectionable content that would trigger a masking action for each of the listed identifiers detected in media content comprising at least one item on or related to (e.g., as determined by an intent analyzer or other algorithm to statistically determine a relationship between strings of characters via metadata or other available data) each list of objectionable content triggering masking actions. For example, as shown in association matrix 800A, column 802A lists exemplary technology and/or device entities (e.g., Apple, Samsung, and Google). Column 804A lists entity identifiers for each of the entities that would yield an association between the identifier and the entity (e.g., a logo, a string of characters comprising a company name, and/or a device of a well-known make or model such as a smart mobile device). Column 804B provides three scenarios that would trigger a masking action for each, including a car accident, riots that conflict with the entity agenda, and media content characters performing actions not suitable for a target audience for a product (e.g., an artist in an explicit music video using a device intended for customers below an age limit for viewing the explicit music video).

As shown in association matrix 800B, a list of automotive manufacturers populate column 802B with a similar list of identifiers to 804A in 804B with the addition of dealerships selling the vehicles (e.g., each association matrix for different industry types may comprise entity identifiers of different types). Column 806B of association matrix 800B also excludes the masking scenario of media content characters misusing a product for particular age range since vehicles are typically made available for consumers of age to view explicit music videos. Association matrix 800C comprises column 802C listing Walmart, Burger King, and a local enterprise (e.g., a store or restaurant with a single location that may have broad reaching advertisements, but only provides products and/or services out of a single location. The entity identifiers listed in column 804C are different for each entity (e.g., Walmart includes delivery vehicles while the others do not) considering the type of identifiers may be different for different industries and different businesses. Column 806C also shows a scenario of a violent crime and a scenario of an incident deterring customers (e.g., a health protocol issue) as the entities listed in column 802C may be subjected to different events that the entities in association matrices 800A and 800B are not concerned with as impacting their businesses.

FIG. 9 depicts product displays 900A-E, which collectively comprise examples of masking actions that are performed for entity identifiers present in a content item comprising objectionable content, in accordance with some embodiments of the disclosure. Product displays 900A-E may be generated by any or all components depicted in and described in reference to masking scenario 100 of FIG. 1, masking process 200 of FIG. 2, system 300 of FIG. 3, masking process 400 of FIG. 4, masking process 500 of FIG. 5, content item versions 600A and 600B of FIG. 6, masking process 700 of FIG. 7, masking protocols 800A-C of FIG. 8, and masking process 1000 of FIG. 10. Each of product displays 900A-E be generated as a result of the execution of any or all of masking processes 200, 400, 500, 700, and 1000 of FIGS. 2,4, 5, 7, and 10, respectively, in whole or in part. Product displays 900A-E may be generated by using masking protocols 800A-C of FIG. 8 and/or may be used in the generation of content item version 600B of FIG. 6.

Product display 900A comprises an original, unmasked product with a visible product display (e.g., a can of Coca-Cola with the label presented). In response to determining a masking action is required for media content (e.g., as described in reference to the other figures) that displays product display 900A, one of product displays 900B-E is the result of a designated masking action. Product displays 900B and 900C each obscure only a displayed label or logo. Product display 900B corresponds to a pixilation of the label or blurring of the label while product display 900C corresponds to using a censor bar or a blackout method obscuring the label. Product display 900D corresponds to an example wherein all of product display 900A is obscured from view, including the shape (e.g., useful where an entity may be identified by a particular product geometry, shape, or size). Product display 900E corresponds to a product replacement image (e.g., a can of Sprite) where, as described in reference to FIG. 7, a licensing agreement is invalid for one product and a viewer of the media content has profile data indicating interest in another product of the same type (e.g., the viewer prefers Sprite to Coca-Cola).

FIG. 10 depicts masking process 1000, which comprises an illustrative process for updating a machine learning model configured to provide recommendations to selectively mask new entity identifiers based on information indicating that the subject matter of a content item displaying the new entity identifier may yield a negative association between the entity identifier and the content item displaying the new entity identifier, in accordance with some embodiments of the disclosure. It is understood that masking process 1000 may be executed by any or all components depicted in and described in reference to masking scenario 100 of FIG. 1, masking process 200 of FIG. 2, system 300 of FIG. 3, masking process 400 of FIG. 4, masking process 500 of FIG. 5, content item versions 600A and 600B of FIG. 6, masking process 700 of FIG. 7, masking protocols 800A-C of FIG. 8, and product displays 900A-E of FIG. 9. Masking process 1000 may also incorporate, during execution, any or all of masking processes 200, 400, 500, and 700 of FIGS. 2,4, 5, and 7, respectively, in whole or in part. Additionally, masking process 1000 may result in the use or generation of content item versions 600A and 600B of FIG. 6, masking protocols 800A-C of FIG. 8, and/or product displays 900A-E of FIG. 9.

At 1002, a request to display media content received (e.g., as described in reference to FIG. 1). If, at 1004, the media content is determined to not comprise any frames with objectionable content, based on video/audio analysis as compared to a stored list of objectionable content or subject matter (NO at 1004), then the process ends as no masking action is required. If, at 1004, the media content is determined to comprise at least one frame with objectionable content (YES at 1004), then a first context of the objectionable content is determined, wherein the first context comprises at least one of 1) an event type and 2) an adversely affected industry at 1006. If, at 1008, an entity identifier is not found in the content item either by video, image, or audio analysis (NO at 1008), then the process ends as no masking action is required. If, at 1008, an entity identifier is determined to be visible by a user or audible to the user in the content item (YES at 1008), then stored association matrices are reviewed for the entity identifier at 1010 (e.g., like those shown in FIG. 8). If, at 1010, the entity identifier is determined to be in at least one association matrix, then the association matrix is retrieved at 1012, and the process proceeds to process block 214 of FIG. 2 to complete the analysis on whether a masking action for the entity identifier as visible or audible in the media content is required.

If, at 1010, the entity identifier is not present in any of the retrieved association matrices (NO at 1010), then an industry associated with the entity identifier is determined at 1014. At 1016, at least one association matrix corresponding to at least one of 1) the industry associated with the entity identifier and 2) the event type is retrieved. For example, if the entity identifier is for a motorcycle brand and the event type is a motorcycle accident, then an association matrix for a car brand with protocols for a car accident may be retrieved at 1016. The similarity may be based on a threshold similarity rating based on associations between strings of characters or images extracted in association with the entity identifier. Additionally, an intent or context determination engine may be utilized for analyzing strings of characters extracted from data associated with the entity identifier. In some embodiments, a business entity representative may be notified of the analysis being performed such that the business entity may provide a prepopulated association matrix in line with the business entity protocols. At 1018, a new association matrix is identified based on the at least one association matrix achieved. At 1020, the new association matrix is stored in memory for future masking analysis of the entity identifier. At 1022, a notification for transmission to at least one of 1) an entity associated with the identifier and 2) a system administrator indicating the new association matrix for the entity identifier is generated. The process then proceeds to process block 214 of FIG. 2 to complete the analysis on whether a masking action for the entity identifier as visible in the media content is required.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
receiving a request to display media content;
determining the media content comprises at least one frame, wherein the at least one frame comprises objectionable subject matter;
in response to determining the at least one frame comprises objectionable subject matter, determining whether an entity identifier is visible in the at least one frame;
in response to determining that the entity identifier is visible in the at least one frame, determining whether a length of time that the entity identifier is visible exceeds a predetermined threshold amount of time;
in response to determining that the visibility of the entity identifier in the at least one frame exceeds the threshold amount of time, determining a first context of the objectionable subject matter and a second context of the entity identifier;
comparing the first context to the second context;
determining, based on the comparing, that a masking action is required for the entity identifier; and
performing the masking action on the at least one frame such that the entity identifier is affected by the masking action while the media content is displayed.

2. The method of claim 1, wherein the media content comprises at least one of a content item available via a content platform or a media stream.

3. The method of claim 1, wherein receiving the request comprises receiving at least one of a character-based input, an audio input, or a selection of an enabling icon.

4. The method of claim 1, wherein the objectionable subject matter comprises at least one of violence, a crime, or subject matter that induces adverse commentary.

5. The method of claim 1, wherein the entity identifier comprises at least one of a string of characters associated with an entity, a symbol associated with an entity, or a product associated with an entity.

6. The method of claim 5, wherein the entity comprises at least one of a business or a brand.

7. The method of claim 1, further comprising:
determining a location of a device on which the request was received;
retrieving a database of entities associated with the location, wherein the entities in the database require a masking action when detected;
comparing the at least one entity identifier to the database of entities; and
in response to determining the at least one entity identifier corresponds to at least one entity in the database of entities, generating a selectable option for a masking action for an administrator associated with an entity corresponding to the at least one entity identifier.

8. The method of claim 1, wherein the first context comprises at least one of a location, an event, and an industry adversely affected by the event.

9. The method of claim 1, wherein the second context comprises at least one of a location, an industry, and a list of events that adversely impact the industry.

10. The method of claim 1, wherein the masking action comprises at least one of removing, visibly obscuring, or audibly obscuring the entity identifier in the at least one frame.

11. A system comprising:
input/output circuitry configured to:
receive a request to display media content; and
processing circuitry configured to:
determine the media content comprises at least one frame, wherein the at least one frame comprises objectionable subject matter;
in response to determining the at least one frame comprises objectionable subject matter, determine whether an entity identifier is visible in the at least one frame;
in response to determining at least one entity identifier is visible in the at least one frame, determine whether a length of time that the entity identifier is visible exceeds a predetermined threshold amount of time;
in response to determining that the visibility of the entity identifier in the at least one frame exceeds the threshold amount of time, determine a first context of the objectionable subject matter and a second context of the entity identifier;
compare the first context to the second context;
determine, based on the comparing, that a masking action is required for the entity identifier; and
perform the masking action on the at least one frame such that the entity identifier is affected by the masking action while the media content is displayed.

12. The system of claim 11, wherein the media content comprises at least one of a content item available via a content platform or a media stream.

13. The system of claim 11, wherein the input/output circuitry configured to receive the request is further configured to receive at least one of a character-based input, an audio input, or a selection of an enabling icon.

14. The system of claim 11, wherein the objectionable subject matter comprises at least one of violence, a crime, or subject matter that induces adverse commentary.

15. The system of claim 11, wherein the entity identifier comprises at least one of a string of characters associated with an entity, a symbol associated with an entity, or a product associated with an entity.

16. The system of claim 15, wherein the entity comprises at least one of a business or a brand.

17. The system of claim 11, wherein the processing circuitry is further configured to:
determine a location of a device on which the request was received;
retrieve a database of entities associated with the location, wherein the entities in the database require a masking action when detected;
compare the at least one entity identifier to the database of entities; and
in response to determining the at least one entity identifier corresponds to at least one entity in the database of entities, generate a selectable option for a masking action for an administrator associated with an entity corresponding to the at least one entity identifier.

18. The system of claim 11, wherein the first context comprises at least one of a location, an event, and an industry adversely affected by the event.

19. The system of claim 11, wherein the second context comprises at least one of a location, an industry, and a list of events that adversely impact the industry.

20. The system of claim 11, wherein the processing circuitry configured to perform the masking action is further configured to perform at least one of removing, visibly obscuring, or audibly obscuring the entity identifier in the at least one frame.

\* \* \* \* \*